United States Patent
Brooks Powell et al.

(10) Patent No.: US 11,704,108 B2
(45) Date of Patent: Jul. 18, 2023

(54) ACTIVITY-AWARE UPDATE MANAGEMENT

(71) Applicant: International Business Machines Corporation, Armonk, NY (US)

(72) Inventors: Natalie Brooks Powell, Bolingbrook, IL (US); Bobbi Davitt, Basking Ridge, NJ (US); Sarbajit K. Rakshit, Kolkata (IN); Tami Rose Bryan, Howard, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/337,472

(22) Filed: Jun. 3, 2021

(65) Prior Publication Data

US 2022/0391187 A1   Dec. 8, 2022

(51) Int. Cl.
  *G06F 8/65*   (2018.01)
  *H04L 67/00*   (2022.01)

(52) U.S. Cl.
  CPC .............. *G06F 8/65* (2013.01); *H04L 67/34* (2013.01)

(58) Field of Classification Search
  USPC ........................................................ 717/168
  See application file for complete search history.

(56) References Cited

U.S. PATENT DOCUMENTS

| | | | |
|---|---|---|---|
| 8,321,527 B2 | 11/2012 | Martin | |
| 8,893,108 B1 | 11/2014 | Pfeiffer | |
| 9,400,643 B2 | 7/2016 | Poiesz | |
| 10,972,372 B2* | 4/2021 | Venkatraman | H04L 67/22 |
| 2006/0080656 A1* | 4/2006 | Cain | G06F 8/65 434/118 |
| 2006/0130040 A1* | 6/2006 | Subramanian | G06F 8/65 717/168 |
| 2007/0192763 A1 | 8/2007 | Helvick | |
| 2009/0183148 A1* | 7/2009 | Bagrecha | G06F 8/61 717/171 |
| 2011/0088026 A1 | 4/2011 | Swann | |
| 2014/0047425 A1 | 2/2014 | Thapar | |
| 2016/0259638 A1* | 9/2016 | El Maghraoui | G06F 8/65 |
| 2018/0136921 A1* | 5/2018 | Pfleger de Aguiar | G06N 7/01 |
| 2019/0259223 A1* | 8/2019 | Sangameswaran | G07C 5/0841 |
| 2021/0109736 A1* | 4/2021 | Ali | G06F 8/65 |

OTHER PUBLICATIONS

R. Reboucas et al; "A Decision Support Tool to Optimize Scheduling of IT Changes"; 2007 10th IFIP/IEEE International Symposium on Integrated Network Management, pp. 343-352; 2007 (Year: 2007).*

* cited by examiner

*Primary Examiner* — Wei Y Zhen
*Assistant Examiner* — Clint Thatcher
(74) *Attorney, Agent, or Firm* — Brian M. Restauro (57) ABSTRACT

Embodiments of the present invention provide computer-implemented methods, computer program products and computer systems. Embodiments of the present invention can, in response to receiving a request to perform an update, identify priorities of pending activities. Embodiments of the present invention can then determine a downtime duration associated with the update. Embodiments of the present invention can then determine an optimal time to perform the update based, at least in part, on the determined downtime duration and the pending activities.

17 Claims, 4 Drawing Sheets

ACTIVITY-AWARE UPDATE MANAGEMENT

BACKGROUND

The present invention relates in general to software updates and in particular to contextual activity-aware software update management.

Software updates typically offer a way for software developers to refine a product (e.g., an application, program, etc.). In general, software updates offer small, frequent improvements rather than major changes. Unlike a software upgrade, software updates require at least an instance of the existing software program to be installed on a user's device.

Updates sometimes run automatically in the background. Other times, software updates also referenced as "patches," require the user to download the software update depending on a user's preference. Typically, a patch references a set of changes to a computer program or a set of changes to its supporting data that is designed to update, fix, or improve it. This can include security vulnerabilities or bug fixes and are designed to improve the functionality, usability, or performance of a program.

SUMMARY

According to an aspect of the present invention, there is provided a computer-implemented method. The computer implemented method comprises in response to receiving a request to perform an update, identifying priorities of pending activities; determining a downtime duration associated with the update; and determining an optimal time to perform the update based, at least in part, on the determined downtime duration and the pending activities.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize limitations with existing software update management systems. Software updates typically include updates for operating systems, security path upgrades, and application updates. In some instances, options to perform the update are limited. For example, the update may be performed as an automatic push to a respective user device while in other instances, a user is provided an option to delay the system update. Embodiments of the present invention recognize that typically software system updates on mobile devices today typically take around twenty to thirty minutes, depending on the complexity of the update. At times, the update can take hours. Generally, during an update (e.g., software update or upgrade), the device (e.g., mobile or otherwise) requires downtime (i.e., cannot be used or otherwise less than normal functional capabilities). In other words, users can experience loss of device functions ranging from a few minutes to a few hours. Embodiments of the present invention also recognize that in most circumstances, a user does not know how long an update may take until the update is finished. This can typically result in a user being without functional use of the device at inconvenient times. For example, a user may start the update and realize that the update is taking longer than expected and the user may not have enough free time to wait on the update to complete.

Embodiments of the present invention solve this problem by providing a proactive solution that can be implemented before an update occurs. For example, embodiments of the present invention predict an estimate amount of time (e.g., duration of downtime) that an update requires to complete (i.e., finish the update). Embodiments of the present invention can then generate a notification to the user and notify the user of the estimated downtime. Certain embodiments of the present invention can also consider user's pending activities and either remind the user to complete pending activities or transmit a recommendation based on context which activities should be completed prior to performing the update. Other embodiments of the present invention can provide a manual override for manual software updates. In this scenario, embodiments of the present invention can generate a list to be displayed on a user device that shows a pending list of activities. This embodiment of the present invention can further schedule the activities, and in response to completing the scheduled activities, initiate the software update on the device.

An "activity" as used herein, refers to one or more tasks that need to be completed. In some circumstances an activity be a task associated with a user. For example, an activity can include writing an email, placing an order for food, refilling a prescription. In certain other circumstances an activity can be a task requested to be performed by an application of the device. For example, an activity can include a video rendering, compiling code, an upload, a download, etc.

Figure 1:
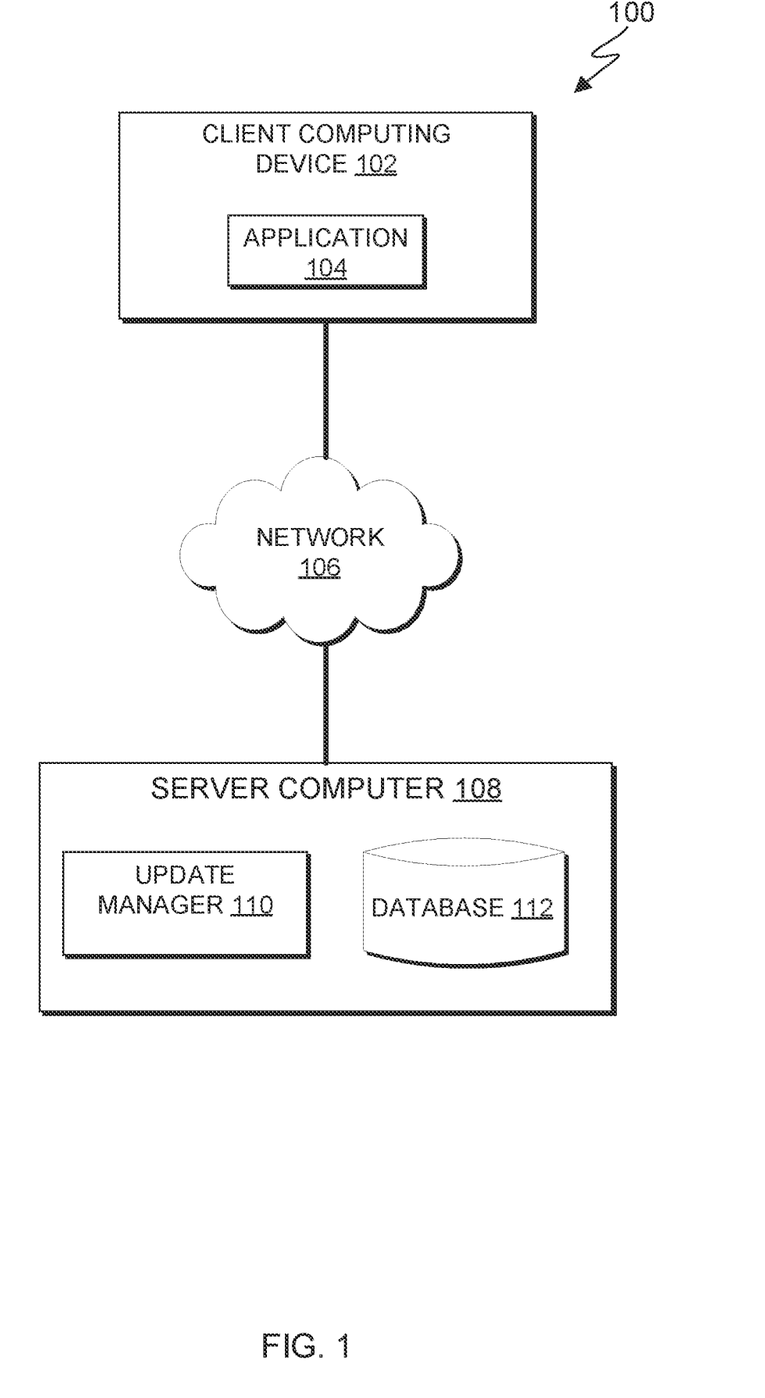
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access update manager 110 (e.g., using TCP/IP) to access content, user information, and database information. Application 104 can further communicate with update manager 110 to transmit instructions to predict an estimated amount of time for an update to finish (e.g., to complete) that considers pending activities that need to be performed prior to initiating the update as discussed in greater detail in FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts update manager 110 and database 112. In this embodiment, update manager 110 resides on server computer 108. In other embodiments, update manager 110 can have an instance of the program (not shown) stored locally on client computer device 102. In other embodiments, update manager 110 can be a standalone program or system that predicts an estimated amount of time for an update to finish (e.g., to complete) that considers pending activities that need to be performed prior to initiating the update. In yet other embodiments, update manager 110 can be stored on any number or computing devices.

Update manager 110 predicts an estimated amount of time for an update to finish (e.g., to complete) that considers pending activities that need to be performed prior to initiating the update. In this embodiment, update manager 110 can predict an estimated amount of time for an update to finish (e.g., estimated downtime) based on the user's pending activities, the time in takes a user to complete those activities, and how those activities would be impacted based on the estimated downtime. For example, update manager 110 can predict an optimal time to initiate a software update using historical data, analysis of the user's activities, and the time required to perform the activities. In this manner, update manager 110 can then utilize these predictions (e.g., estimated downtime, relative priorities of pending activities, estimated time it takes to complete each of those pending activities, etc.) to recommend a time, when the device can be upgraded, or predict a time when the user will not be using the device for a sufficient amount of time to initiate and complete the software update as discussed in greater detail with regard to FIGS. 2-3.

Update manager 110 can evaluate relative priority of each activity of the identified activities in light of the software upgrade. For example, update manager 110 can generate a priority score for each activity based, at least in part, on an estimated time to complete respective activities, and on user preferences. In this embodiment, a numeric scale is used where greater numbers correspond to a higher priority and lesser numbers correspond to a lower priority. For example, in a numeric scale from one to ten, a priority score of one would indicate a lower priority than a priority score of five. Similarly, update manager 110 can assign a priority score for the received software update and generate a ranking.

Figure 2:
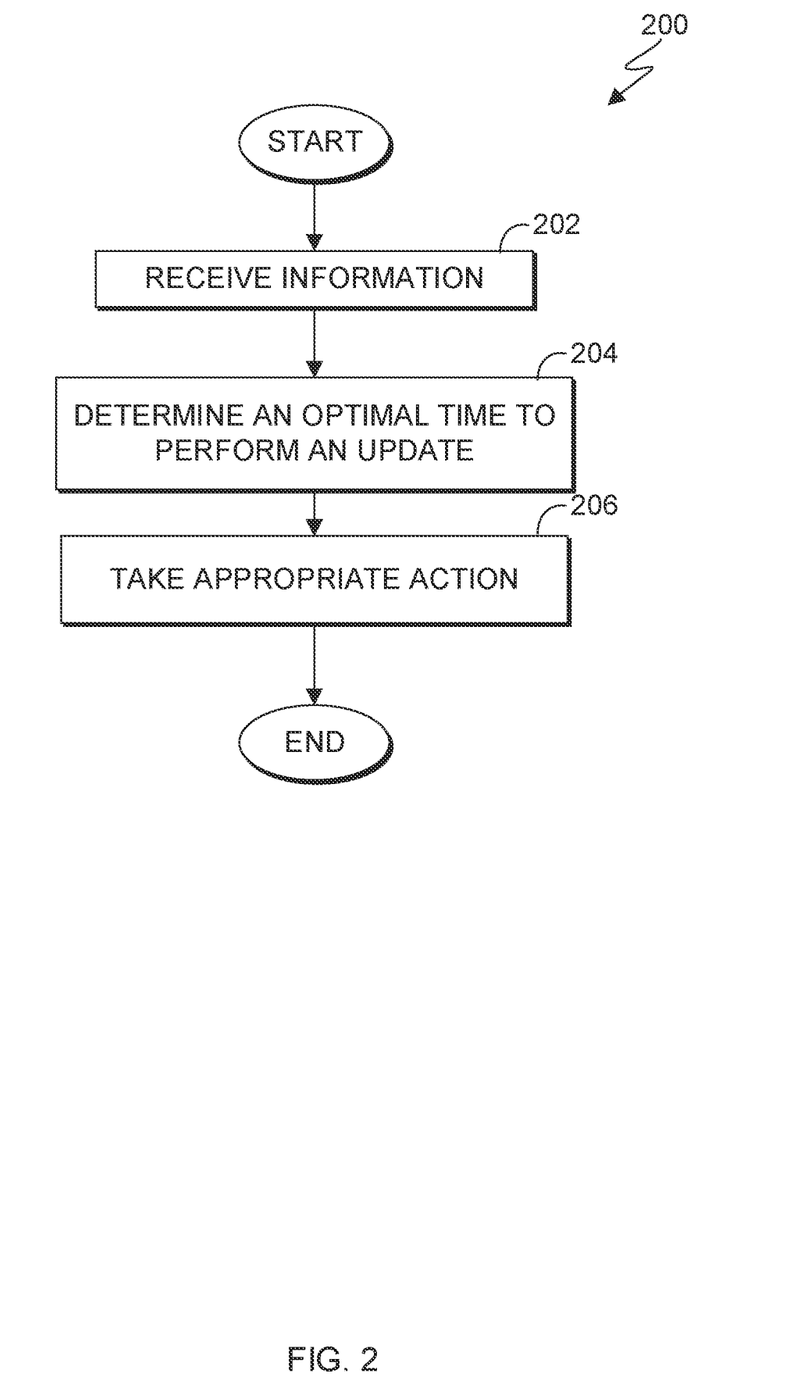
FIG. 2 is a flowchart depicting operational steps determining an optimal time to perform an update, in accordance with an embodiment of the present invention.
Figure 3:
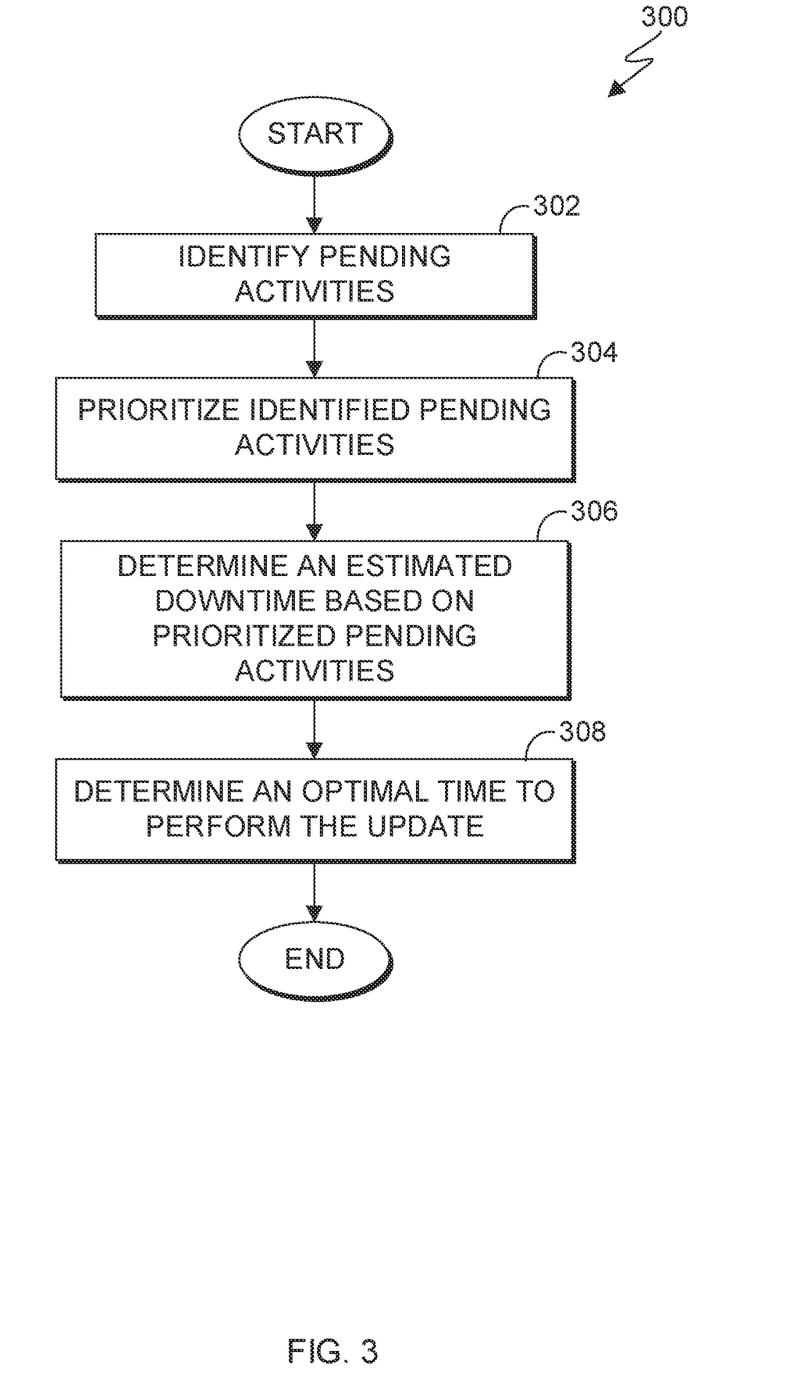
FIG. 3 is a flowchart depicting operational steps for determining whether an object is unintended, in accordance with an embodiment of the present invention.

In this embodiment, update manager 110 calculates a priority score as the summation of a value score (e.g., value score reflects a score used to assess the value of activity with respect to the user) and effort score (e.g., an effort score reflects the amount of user input required to complete the task) assigned to a respective activity as discussed in greater detail with regard to FIGS. 2 and 3.

Update manager 110 can then determine an order of priority for the pending activities and the priority of the software upgrade based on a relative comparison. In this example, the order of priority is based on the priority score, that is, while greater numbers indicate higher priority, update manager assigns lower numbers to indicate order in which these pending activities should be completed. For example, as between two activities, activity A having a priority score of "five" and activity B having a priority score of "ten", update manager 110 assigns Activity B a priority order of "one" and assigns activity A, a priority order of "two". In this manner, update manager 110 coveys that activity B should be performed before activity A.

In another example, update manager 110 can perform a contextual and comparative analysis to further refine its priority order between both the identified pending activities and the software update. For example, update manager 110 can, in response to identifying three pending activities, assign each pending activity a priority score. In this example, update manager 110 assigns pending activity A, a priority score of "two", pending activity B a priority score of "three", and pending activity C a priority score of "ten". Update manager 110 has further assigned the software update a priority score of "five" and that the update will take about twenty minutes. In this example, update manager 110 can recommend that pending activities C be performed prior to the software update followed by activity A and activity B.

Update manager 110 can then, in light of the determined priority orders and estimated downtime, create an estimated timeline to complete each of the identified activities and the software update. For example, in certain embodiments, update manager 110 can create respective calendar entries for the user for each identified activity, specifying estimated amounts of time to complete respective activities. Update manager 110 can also create a calendar entry for the optimal time to initiate the software update based on the estimated downtime associated with the software update, priority orders of pending activities and respective estimated time to complete those pending activities.

In certain other embodiments, update manager 110 can first estimate a total time for an update to initiate and complete and then identify pending activities are impacted based on the estimated total time the update will take. In these embodiments, update manager 110 can then establish a relative priority between the update and the identified pending activities and select either the software update or the identified pending activities to initiate based on the established relative priority. In other embodiments, update manager 110 can initiate portions of the identified pending activities rather than the entire set of pending activities before initiated the software update.

In certain embodiments, update manager 110 can either recommend a time, when the device can be upgraded (e.g., and subsequently create calendar entries for the user as discussed above) or predict a time when the user will not be using the device for a sufficient amount of time to initiate and complete the software update. In instances where update manager 110 identifies an estimated downtime is required and cannot be performed in light of pending activities (e.g., during business hours), update manager 110 can recommend an alternate method of completing the activity. For example, update manager 110 can notify another user to perform the activity or recommend other delegation of the activity on another device.

In certain other embodiments, where the pending activity is a task requested to be performed by an application of the device, then update manager 110 can offload portions of the task to another computing device for the duration of the software update. For example, update manager 110 can, in response to determining downtime is required, determine requirements of the pending task and automatically initiate the task. Specifically, update manager 110 can recognize that in order to perform the activity with another device, a set of data is required. In this example, update manager 110 can push relevant data to cloud-based services so that the activity can be performed on another device.

Database 112 stores received information and can be representative of one or more databases that give permissioned access to update manager 110 or publicly available databases. For example, database 112 can store received user biometrics and created visual simulations. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 is a flowchart 200 depicting operational steps determining an optimal time to perform an update, in accordance with an embodiment of the present invention.

In step 202, update manager 110 receives information. In this embodiment, update manager 110 receives a request from client computing device 102 to perform a software upgrade. In other embodiments, the information received may be a request to register for the services of update manager 110. In other embodiments, update manager 110 can receive information from one or more other components of computing environment 100.

Information received can also include user preferences, user activities, and user selections. In this embodiment, user preferences can include a preference for update times, performance requirements, work schedules, maximum wait times a user takes to update respective devices, etc. User activities can include information from calendar data, current activities being performed (e.g., pending activities), amounts of time a user takes to perform an activity, application usage (e.g., user selections), type of applications used, etc. Update manager 110 can store and subsequently update user preferences and selections to build a historical corpus.

In step 204, update manager 110 determines an optimal time to perform an update. In this embodiment, update manager 110 determines an optimal time to perform an update based on identified pending activities. For example, in this embodiment, update manager 110 can determine an optimal time to perform an update by determining an estimated downtime that it would take for an update to initiate and complete as discussed in greater detail with respect to FIG. 3. In this embodiment, update manager 110 can determine an optimal time as either a recommended time to initiate the update after pending activities are estimated to be completed or a predicted time to be the time when the user will not be using the device for a sufficient amount of time to initiate and complete the software update.

In step 206, update manager 110 takes appropriate action. In this embodiment, update manager 110 takes corrective action by generating a notification, taking one or more actions, and generating one or more recommendations.

In this embodiment, a notification can include text and one or more graphics to be displayed on a user interface that includes the predicted optimal time to perform (i.e., initiate) the update and estimated time it takes to complete the update after initiation at the predicted optimal time. In other embodiments, the notification can be configured according to user preferences.

In this embodiment, update manager 110 take one or more actions based on the determined optimal time to perform an update. In some embodiments, update manager 110 can further refine the generated notification. For example, update manager 110 can further configure the notification to be displayed at regular intervals until the predicted optimal time is reached (e.g., reminder displays).

Other actions update manager 110 can perform includes modifying a user's calendar or a user's list of pending activities. For example, update manager 110 can, in response to determining an optimal time by recommending a time to initiate the update, create an estimated timeline to complete each of the identified activities and the software update. Specifically, in certain embodiments, update manager 110 can create respective calendar entries for the user for each identified activity, specifying estimated amounts of time to complete respective activities. Update manager 110 can also create a calendar entry for the optimal time to initiate the software update based on the estimated downtime associated with the software update, priority orders of pending activities and respective estimated time to complete those pending activities.

In certain embodiments, where update manager 110 predicts that an optimal time is a time when the user will not be using the device for a sufficient amount of time to initiate and complete the software update, update manager 110 can take one or more other actions. In this embodiment, an action can be an automated action or a generated recommendation. Specifically, update manager 110 can recommend an alternate method of completing the activity. For example, update manager 110 can notify another user to perform the activity or recommend other delegation of the activity on another device. In another example, where the pending activity is a task requested to be performed by an application of the device, then update manager 110 can offload portions of the task to another computing device for the duration of the software update. In this scenario, update manager 110 can automatically initiate the task (e.g., offload portions of the task and initiate the update).

FIG. 3 is a flowchart 300 depicting operational steps for determining whether an object is unintended, in accordance with an embodiment of the present invention.

In step 302, update manager 110 identifies pending activities. In this embodiment, update manager 110 identifies pending activities by transmitting a request to receive pending activities of a user's device. In other embodiments, update manager 110 can identify pending activities the request can be transmitted pursuant to a set period of time (e.g., every minute, intervals of minutes, hours, etc.). In yet other embodiments, update manager 110 may be granted permissions to access device information of the user to identify pending activities (e.g., phone call, upload, user tasks, etc.).

In step 304, update manager 110 prioritizes identified pending activities. In this embodiment, update manager 110 prioritizes identified pending activities by assigning a priority score to each activity of the identified pending activities and utilize the assigned priority scores to create a rank indexing of the identified pending activities. In this embodiment, update manager 110 assigns a priority score by assigning an effort score for the identified activity and adding the effort score to an assigned value score associated with the identified activity.

In this embodiment, an effort score reflects the amount of user input required to complete the task. For example, where an activity is identified as a writing assignment, update manager 110 defaults the score to the maximum value of ten since the activity is 100% performed by the user. Conversely, where an activity is identified as completing an upload, update manager 110 can assign the lowest score of one since the activity requires no user intervention after initiation of the upload.

In this embodiment, the value score reflects a score used to assess the value of activity with respect to the user. For example, a greater value score (e.g., with greater numerical numbers) indicates a higher user value (i.e., priority) to the user. In this embodiment, update manager 110 assigns the value score based on the number of occurrences the user has with the activity and the amount of time the user spends on the activity.

In certain other embodiments determine or otherwise identify activities related to respective identified pending activities (e.g., related activity). For example, update manager 110 can communicate with other Internet of Things (IoT) devices within a certain proximity of a respective user device and identify whether other the mobile device are being used to perform an activity associated with the user device. In this scenario, update manager 110 can use the identified related activities (e.g., distributed processing) to modify the priority score for an activity. In some embodiments, update manager 110 can also identify other devices that can be used to perform an activity associated with the user device (e.g., activities where the mobile device is being used as a universal remote).

In yet other embodiments, update manager 110 can utilize a user's location when determining priority of pending activities. For example, update manager 110 can access, when given permission, user location using a combination of GPS coordinates and other device position to derive location (e.g., NFC, Bluetooth, Wi-Fi) of the user. Update manager 110 can leverage the location information and determine if the user will remain in a fixed location for a period of time based on calendar information and GPS data associated with the user device (e.g., where the user device is a mobile phone).

Update manager 110 can further note and otherwise leverage device information such as network availability (e.g., cellular network, Wi-Fi, etc.) and the appropriate total battery availability. For example, update manager 110 can utilize location information (e.g., user is in a public venue) and on Wi-Fi network with battery at 100%.

In step 306, update manager 110 determines an estimated downtime based on prioritized pending activities. In this embodiment, update manager 110 determines an estimated downtime based on the prioritized pending activities by parsing through release notes associated with the received software update and assigning the received software update a priority score. Update manager 110 can then perform a contextual analysis to understand importance of each pending activity and a comparative analysis of the pending activities compared to the importance of the software update.

In this embodiment, update manager 110 can perform contextual analysis using one or more machine learning algorithms, natural language processing algorithms, and artificial intelligence algorithms to determine which pending activities need to be completed before initiating the update based on the priority score. For example, update manager 110 can further refine the priority score of each pending activity based on any additional received context.

In addition to the contextual analysis, update manager 110 can also perform a comparative analysis while monitoring the status of pending activities to update the determined estimated downtime in real time. For example, update manager 110 can compare priority scores assigned to each activity of the pending activities to the assigned priority score of the software update. In this manner, update manager 110 can determine an order to perform the pending activities and the software update. For example, update manager 110 can, in response to identifying three pending activities, assign each pending activity a priority score. In this example, update manager 110 assigns pending activity A, a priority score of "two", pending activity B a priority score of "three", and pending activity C a priority score of "ten". Update manager 110 has further assigned the software update a priority score of "five" and that the update will take about twenty minutes. In this example, update manager 110 can recommend that pending activities C be performed prior to the software update followed by activity A and activity B.

In step 308, update manager 110 determines an optimal time to perform the update. In this embodiment, update manager 110 determines an optimal time to perform the update by either predicting a time in which to initiate the software update after all pending activities are completed or determining that a period of time in which the device will not be used to complete any pending activity can be used to initiate and complete the software update.

For example, update manager 110 can determine a total length of time for each pending activity to be completed (e.g., based on historical analysis of similar tasks) and length of time it takes to initiate and complete a software update. Continuing the above example, pending activity A can take ten minutes, pending activity B can take twenty minutes, pending activity C can take two hours, and software update can take fifteen minutes. In this example, update manager 110 can two hours and forty-five minutes as the total length of time to complete both the pending tasks and the software update. Update manager 110 can then determine an optimal time to schedule each activity as well the software update within the total length of time (e.g., within a two-hour, forty-five minute time frame). In certain embodiments, update manager 110 can apportion the total length of time in any configurable way based on user preference. For example, update manager 110 can create a schedule to ensure that one or two of the pending activities are completed in a sequential manner. Update manager 110 can also create a schedule where the pending activities are broken up based on resource usage. For example, update manager 110 can schedule that the first two pending activities are initiated by 9:00 am and completed by 9:30 and then schedule that the software update initiates at 12:00 pm when the user steps away for lunch.

Figure 4:
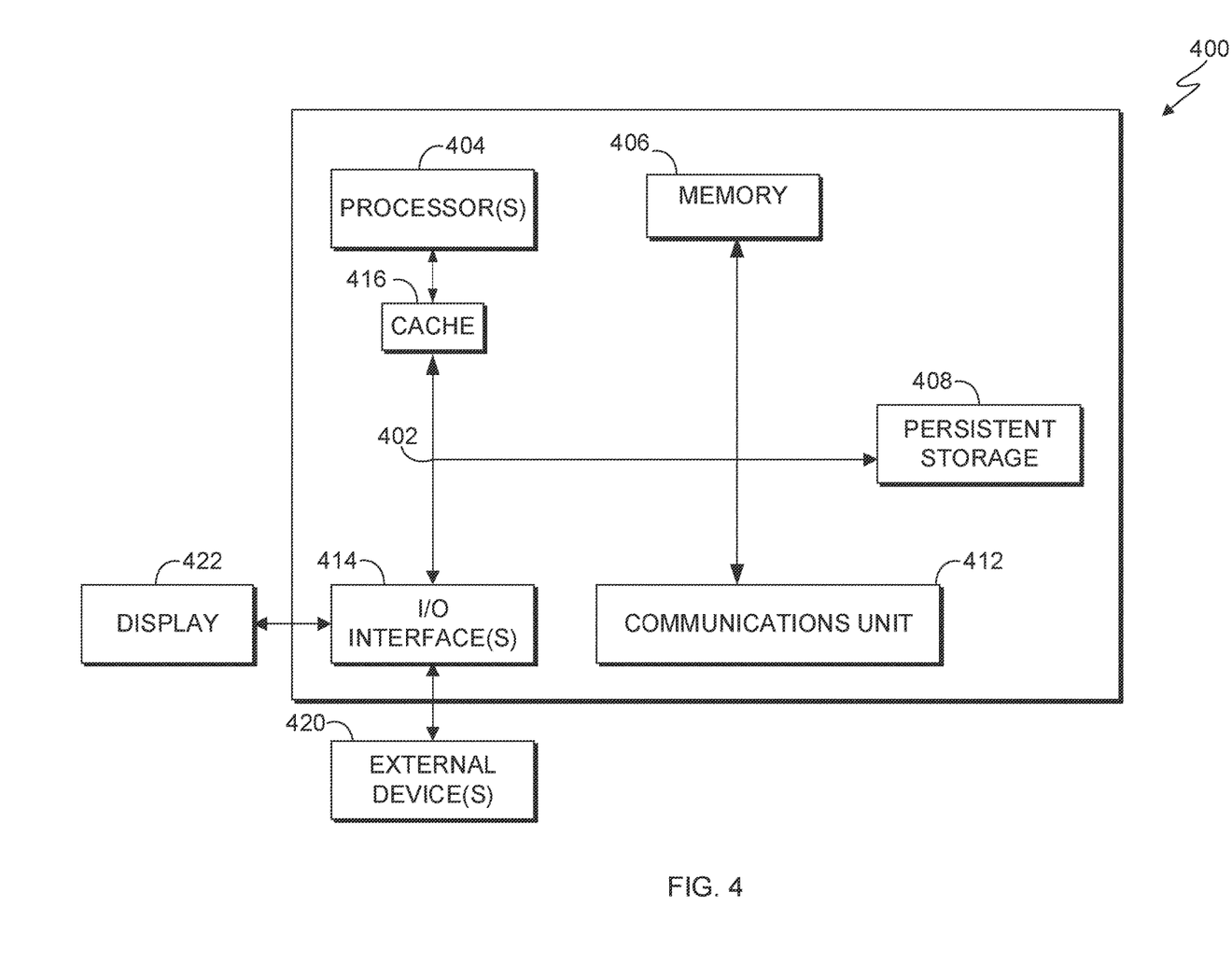
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Update manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Update manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., update manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    in response to receiving a request to perform an update to a system, identifying priorities of pending activities;
    determining a downtime duration associated with the update;
    determining a time to perform the update based on the pending activities to be completed on the system, wherein determining a time to perform the update comprises:
        establishing a relative priority between the update and the identified pending activities by,
            assigning a value score that assesses value of a pending activity with respect to a user added to an effort score that reflects an amount of user assisted activity a respective pending activity needs, and
            determining an order in which to perform each identified pending activity and the update; and
    performing either the update or the identified pending activities according to the determined order based on the established, relative priority.

2. The computer-implemented method of claim 1, further comprising:
    estimating a total time for the update to complete;
    identifying pending activities that are impacted based on the estimated total time the update will take; and
    selecting either the update or the identified pending activities to initiate based on the established, relative priority.

3. The computer-implemented method of claim 1, wherein determining a time to perform the update comprises:
    identifying pending activities of a user device;
    prioritizing each of the identified pending activities;
    determining an estimated downtime of the user device based on the prioritized pending activities and a length of time to complete the update; and
    determining a time to perform the update based on the estimated downtime of the user.

4. The computer-implemented method of claim 3, further comprising:
    creating a schedule to complete each of the identified pending activities and the update based on the determined, estimated downtime.

5. The computer-implemented method of claim 4, further comprising:
    modifying a calendar application of the user device to create respective entries for each of the identified pending activities and the update.

6. The computer-implemented method of claim 1, further comprising:
   recommending an alternate method of completing a pending activity of the pending activities while initiating the update.

7. A computer program product comprising:
   one or more computer readable storage media and program instructions stored on the one or more computer readable storage media, the program instructions comprising:
      program instructions to, in response to receiving a request to perform an update to a system, identify priorities of pending activities;
      program instructions to determine a downtime duration associated with the update; and
      program instructions to determine a time to perform the update based on the pending activities to be completed on the system, wherein the program instructions to determine a time to perform the update comprise:
         program instructions to establish a relative priority between the update and identified pending activities by:
            assigning a value score that assess a value of a pending activity with respect to the user to an effort score that reflects an amount of user assisted activity a respective pending activity needs,
            determining an order in which to perform each identified pending activity and the update, and
         program instructions to perform either the update or the identified pending activities according to the determined order based on the established relative priority.

8. The computer program product of claim 7, wherein the program instructions stored on the one or more computer readable storage media further comprise:
   program instructions to estimate a total time for the update to complete; and
   program instructions to identify pending activities that are impacted based on the estimated total time the update will take.

9. The computer program product of claim 7, wherein the program instructions to determine a time to perform the update comprise:
   program instructions to identify pending activities of a user device;
   program instructions to prioritize each of the identified pending activities;
   program instructions to determine an estimated downtime of the user device based on the prioritized pending activities and a length of time to complete the update; and
   program instructions to determine a time to perform the update based on the estimated downtime of the user.

10. The computer program product of claim 9, wherein the program instructions stored on the one or more computer readable storage media further comprise:
    program instructions to create a schedule to complete each of the identified pending activities and the update based on the determined, estimated downtime.

11. The computer program product of claim 10, wherein the program instructions stored on the one or more computer readable storage media further comprise:
    program instructions to modify a calendar application of the user device to create respective entries for each of the identified pending activities and the update.

12. The computer program product of claim 7, wherein the program instructions stored on the one or more computer readable storage media further comprise:
    program instructions to recommend an alternate method of completing a pending activity of the pending activities while initiating the update.

13. A computer system comprising:
    one or more computer processors;
    one or more computer readable storage media; and
    program instructions stored on the one or more computer readable storage media for execution by at least one of the one or more computer processors, the program instructions comprising:
       program instructions to, in response to receiving a request to perform an update to a system, identify priorities of pending activities;
       program instructions to determine a downtime duration associated with the update; and
       program instructions to determine a time to perform the update based on the pending activities to be completed on the system, wherein the program instructions to determine a time to perform the update comprise:
          program instructions to establish a relative priority between the update and identified pending activities by:
             assigning a value score that assess a value of a pending activity with respect to the user to an effort score that reflects an amount of user assisted activity a respective pending activity needs,
             determining an order in which to perform each identified pending activity and the update, and
          program instructions to perform either the update or the identified pending activities according to the determined order based on the established relative priority.

14. The computer system of claim 13, wherein the program instructions stored on the one or more computer readable storage media further comprise:
    program instructions to estimate a total time for the update to complete; and
    program instructions to identify pending activities that are impacted based on the estimated total time the update will take.

15. The computer system of claim 13, wherein the program instructions to determine a time to perform the update comprise:
    program instructions to identify pending activities of a user device;
    program instructions to prioritize each of the identified pending activities;
    program instructions to determine an estimated downtime of the user device based on the prioritized pending activities and a length of time to complete the update; and
    program instructions to determine a time to perform the update based on the estimated downtime of the user.

16. The computer system of claim 15, wherein the program instructions stored on the one or more computer readable storage media further comprise:
    program instructions to create a schedule to complete each of the identified pending activities and the update based on the determined, estimated downtime.

17. The computer system of claim 16, wherein the program instructions stored on the one or more computer readable storage media further comprise:

program instructions to modify a calendar application of the user device to create respective entries for each of the identified pending activities and the update.

\* \* \* \* \*